C. J. JONES.
WEEDING CULTIVATOR.
APPLICATION FILED MAR. 18, 1916.
1,197,638.
Patented Sept. 12, 1916.
2 SHEETS—SHEET 1.
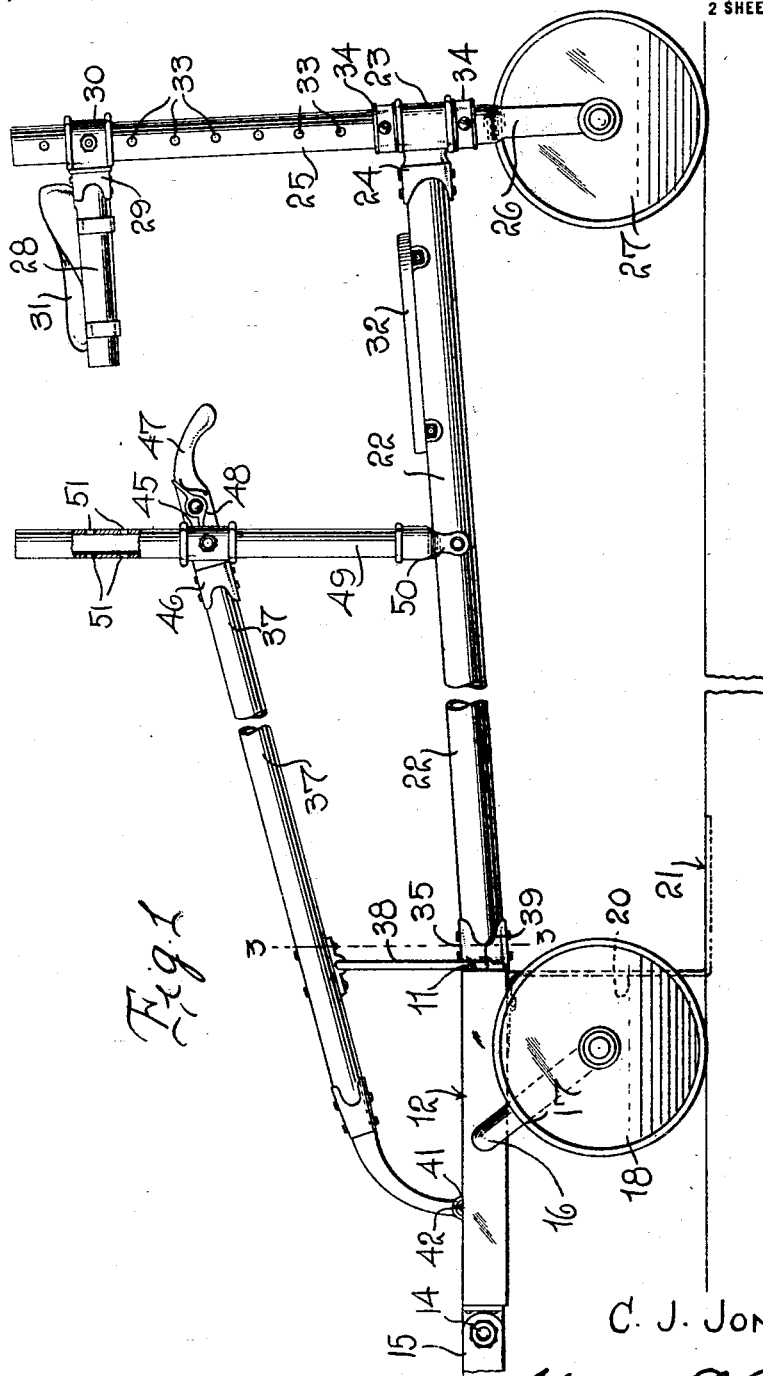
Inventor
C. J. JONES
By Watson E. Coleman
Attorney

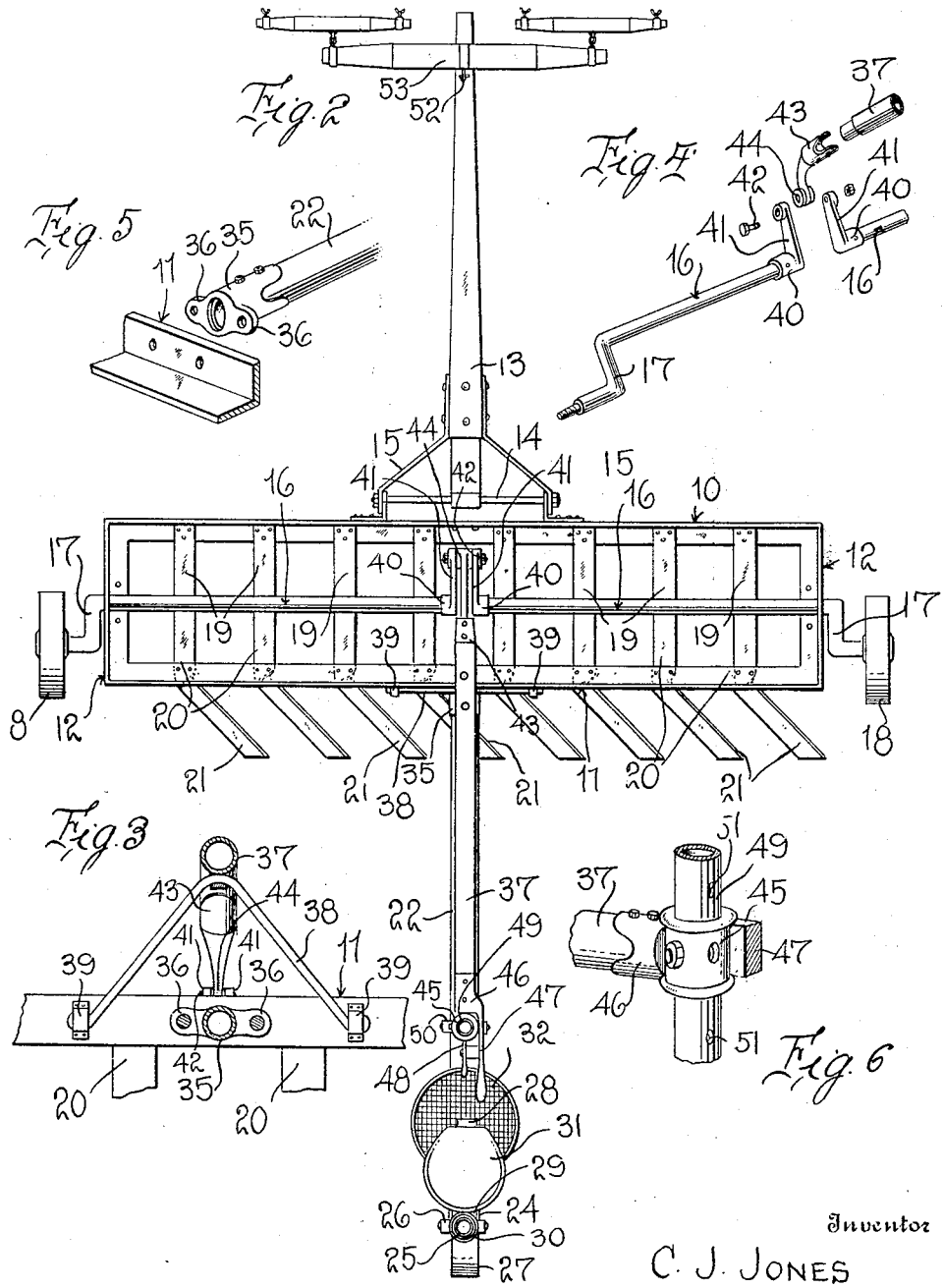

UNITED STATES PATENT OFFICE.

CHARLES J. JONES, OF SNAKE RIVER, WASHINGTON.

WEEDING-CULTIVATOR.

1,197,638.  Specification of Letters Patent.  Patented Sept. 12, 1916.

Application filed March 18, 1916. Serial No. 85,143.

*To all whom it may concern:*

Be it known that I, CHARLES J. JONES, a citizen of the United States, residing at Snake River, in the county of Franklin and State of Washington, have invented certain new and useful Improvements in Weeding-Cultivators, of which the following is a specification, reference being had to the accompanying drawings.

This invention relates to agricultural machines, and particularly to machines designed for cutting off weeds and other plants below the surface of the soil, and the general object of the invention is the provision of a weeding machine adapted to be drawn by horses, wherein the depth of cut of the weeding blades may be regulated by the operation of the lever controlled by the driver.

A further object of the invention is the provision of a weeding machine of the character described wherein the blades are so arranged as to make a clean slicing cut between the blades, and another object is to provide the weeding machine with a trailer, as it may be termed, upon which the driver may stand or sit, this trailer acting to assist in steering the machine and preventing sidewise slip.

Other objects will appear in the course of the following description.

My invention is illustrated in the accompanying drawings, wherein:

Figure 1 is a side elevation of my improved weeding machine, the parts being broken away; Fig. 2 is a top plan view of the weeding machine; Fig. 3 is a vertical section on the line 3—3 of Fig. 1; Fig. 4 is a perspective view of the wheeled supporting shafts and the operating means therefor, the parts being detachable and separated from each other; Fig. 5 is a perspective view of the inner end of the beam 22 and the adjacent angle iron; Fig. 6 is a perspective view of the connection between the beam 37 and the post 49.

Referring to these drawings, it will be seen that my improved weeding machine comprises a rectangular frame formed of transversely extending spaced angle irons 10 and 11 and connecting angle irons 12 at the ends of the frame. To this frame the tongue 13 is pivotally attached by means of the pivot pin 14 and the braces 15.

Operatively supported upon the frame formed of the members 10 and 12 are the transversely extending axles 16 which are mounted in suitable bearings on the frame, each axle at its outer end being cranked, as at 17, and carrying the wheel 18. These wheels are preferably solid wheels so that dirt, trash, etc., will not accumulate within the wheels. It will be obvious now that a rotation of the shaft or axles 16 will cause the wheels 18 to be raised or lowered and that thus the frame may be raised or lowered bodily.

Attached to the frame, and specifically to the lower or horizontal flanges of the angle irons 10 and 11, are the blades. Each blade has a portion 19 which is riveted, bolted or otherwise rigidly attached to the horizontal flanges of the angle irons 10 and 11, a downwardly extending portion 20 and a rearwardly extending blade portion 21. Each blade is deflected or twisted where it extends downward, as at 20, so that the cutting portions of the blades extend rearwardly and at an angle to the line of draft of the machine. Preferably these blades are made of steel about one-half inch thick and three inches wide and about three feet, nine inches long. In practice these blades will be placed about fourteen inches apart and are disposed at such an angle that each blade will cut about four inches beyond the other blade, that is, the path of travel of the extremity of one blade extends beyond the path of travel of the inner end of the next adjacent blade so as to make a clean cut between the blades. As illustrated, there are eight blades, each formed upon its inner face with a cutting edge 21. The frame in ordinary practice will be about nine feet and one-half long.

Operatively connected to the angle iron 11 to extend rearward therefrom is a trailer formed of a beam 22 which may conveniently be made of iron pipe, this beam 22 at its rear end being operatively connected to an approximately vertical sleeve 23. The sleeve 23 may be formed as part of the cap 24 which is bolted or otherwise attached to the rear end of the beam 22. Passing vertically upward through the sleeve 23 is a steering post 25 which is forked at its lower end, as at 26, to engage with the axle of a steering wheel 27. This wheel is also solid for the reasons before stated. At its upper end the steering post 25 has a forwardly projecting arm 28 which preferably fits in the socket 29 formed as part of a sleeve 30 which surrounds the upper end of the steering post and is rigidly connected therewith. A seat 31 may be mounted upon this arm 28, while upon the rear end of the beam 22 there is disposed a small platform 32 upon which the driver of the vehicle stands.

The machine may be steered either by the driver standing upon the platform 32 and operating the arm 28 by hand, or he can straddle the arm 28 sitting upon the seat 31, and by shifting his body shift the arm 28 and thus rotate the post 25. Preferably the post 25 is provided with a plurality of perforations 33 and the collars 34 are provided which may be vertically adjusted on the post and held by pins whereby the sleeve 28 may be held in a vertically adjusted position upon the post 25. The forward end of the beam 22 is preferably inserted in the cap 35 which is bolted or otherwise connected to the beam, this cap being provided with eyes 36 whereby it may be attached to the angle iron 11.

For the purpose of rotating the shafts 16 and thus raising or depressing the wheels 18, I have provided the lever 37 which is pivoted upon a yoke 38, the arms of which extend downward and are laterally bent and engaged in bearings 39 attached in any suitable manner to the angle iron 11. The inner ends of the shafts or axles 16 are provided with caps 40 from which extend arms 41, these arms being parallel to each other and connected by means of a pivot pin 42. The forward end of the lever 37 is disposed within a socket of a cap 43 which has a forward and downwardly projecting arm terminating at its end in a head 44 through which the pin 42 passes whereby the lever is pivotally engaged with the crank arms of the shafts or axles 16. The rear end of the lever 37, which lever may be conveniently made of iron pipe, is engaged with a sleeve 45 pivoted upon a cap 46 bolted or otherwise connected to the lever 37, and the rear end of the lever 37 is also formed with a rearwardly projecting handle 47 and a latch 48 operating through a perforation in the sleeve 45.

The sleeve 45 has sliding engagement upon a post 49 whose lower end is engaged with a fork 50 pivotally connected to the beam 22. This post 49 is formed with a plurality of perforations 51 with which the latch 48 may engage so that the sleeve 45 may be held in any vertically adjusted position upon the post. As illustrated, the tongue 13 at its forward end is provided with an eye bolt 52 connecting with an eye bolt on a yoke 53. As illustrated, this yoke is designed for two horses and it is obvious that the neck yoke may be formed in any other suitable manner and provide for any other number of draft animals desired to be used.

In actual operation the machine will be drawn over the ground to be weeded with the knife portions of the blades 21 cutting just beneath the surface of the soil so as to cut the weeds beneath the surface. Inasmuch as the blades overlap each other it is obvious that every bit of the soil will be operated upon. The cutting depth of the blades may be readily adjusted by rotating the shafts 16. This is accomplished by lifting or depressing the free end of the lever 37. Inasmuch as the yoke 38 which forms the fulcrum for this lever is pivotally connected to the angle iron, it will be plain that provision is made for the forward and rearward movement of the lever 37 and thus provision is also made for the forward and rearward movement of the post 49. The machine may be steered by the driver in the manner heretofore described. It is obvious that the wheel 27 is not only a steering wheel but also acts to keep the machine from sliding down hill and when working on a side hill. It will also act to keep the machine from any skidding action under the resistance of the soil. The wheel 27 with its post 25 may also be used to raise or lower the machine bodily by adjusting the post 25 through the sleeve 23. Thus also it is possible to adjust the relative positions of the arm 28 and the platform 32 and the relative position of the platform to the lever. By adjusting the post 25 downward through the sleeve 23, the beam 22 can be raised to any desired height so as to lift the blades 21 out of their engagement with the ground as for instance, when the machine is moving across grain that is up or through ground that it is not desired to weed. This adjustment of the post 25 relative to the sleeve 23 also acts to vary the angle of the blades relative to the ground, the depth to which the blades operate is secured by adjusting the wheels 18.

It is of course to be understood that many minor changes may be made in the details of construction and arrangement of parts without departing from the spirit of the invention.

Having described the invention, what I claim is:

1. In a weeding machine of the character described, a transversely extending supporting frame, blades attached to the frame and each comprising a horizontal portion attached to the frame and having portions bent downward and then rearward, the rearwardly extending portion being formed with a cutting edge and being inclined to the line of draft, axles rotatably mounted upon the frame and cranked at their outer ends, wheels mounted upon the cranked ends of the axles, a trailer connected to the frame, a steering wheel mounted upon the trailer, and a lever carried upon the trailer for rotating said axles to thereby raise or lower the frame.

2. In a machine of the character described, a supporting frame, rearwardly and downwardly extending weed cutting members mounted thereon, supporting wheels carried by the frame, a tongue pivotally connected to the frame and extending therefrom, a beam rigidly connected to the frame and extending rearward therefrom, a steering wheel rotatably mounted upon the rear end of the beam and having an upwardly extending vertically adjustable post, an operating arm mounted upon said post, and a platform mounted upon the rear end of the beam.

3. In a machine of the character described, a transversely extending frame, a plurality of weed engaging members mounted thereon, cranked axles mounted upon the frame, wheels carried by the axles, a fulcrum extending upward from the frame, a lever mounted upon said fulcrum and operatively connected to the axles and extending rearward from the frame, a beam operatively connected to the frame and extending rearward therefrom, a vertical post rotatably mounted upon the rear end of the beam, a steering wheel carried on the lower end of the post, a steering arm on the upper end of the post, a platform on the rear end of the beam, a post pivotally connected to the beam and extending upward therefrom, a sleeve mounted on the lever and passing over the post, and means for adjustably holding the rear end of the lever upon said post.

4. An agricultural machine comprising a frame, ground engaging members mounted thereon, vertically adjustable wheels supporting the frame, a trailer extending rearward from the frame and having a vertically adjustable steering wheel carried thereby, vertically adjustable means for manually rotating the steering wheel, and means on the trailer for depressing or elevating the supporting wheels of the frame.

In testimony whereof I hereunto affix my signature in the presence of two witnesses.

CHARLES J. JONES.

Witnesses:
E. W. LAUDT,
R. H. CRAIG.